United States Patent [19]
Fabian et al.

[11] Patent Number: 6,000,475
[45] Date of Patent: Dec. 14, 1999

[54] PLANT CUTTING APPARATUS USING COUNTER-ROTATING CUTTER DISC STACKS

[76] Inventors: Nathan Jeffrey Fabian; Edsel Allen Fabian, both of 9 Ethel Street, Toowoomba, Queensland, 4350, Australia

[21] Appl. No.: 08/920,633

[22] Filed: Aug. 29, 1997

[30] Foreign Application Priority Data

Sep. 2, 1996 [AU] Australia .................................. PO2040

[51] Int. Cl.$^6$ .................................................. A01D 13/00
[52] U.S. Cl. .............................................. 171/58; 56/503
[58] Field of Search .................................. 171/58, 62, 50, 171/53, 55; 56/503, 500, 502, DIG. 9, DIG. 17, DIG. 20; 460/112

[56] References Cited

U.S. PATENT DOCUMENTS

| | | |
|---|---|---|
| Re. 25,991 | 3/1966 | Gorham ...................................... 56/503 |
| 2,067,104 | 1/1937 | Spell ........................................... 56/503 |
| 2,537,586 | 1/1951 | Huitema ..................................... 56/503 |
| 2,648,942 | 8/1953 | Grant et al. ............................ 56/503 X |
| 3,090,188 | 5/1963 | Gorham ....................................... 56/503 |
| 4,174,601 | 11/1979 | Griffin .................................... 56/503 X |
| 4,350,207 | 9/1982 | Ben-Dor ...................................... 171/58 |
| 4,397,136 | 8/1983 | McLeod ................................. 56/503 X |
| 4,459,796 | 7/1984 | Stokes .................................... 56/503 X |
| 4,733,525 | 3/1988 | Pellenc et al. ............................. 56/503 |
| 5,642,608 | 7/1997 | Sanderson ..................................... 56/28 |

*Primary Examiner*—Victor Batson
*Attorney, Agent, or Firm*—DeLio & Peterson, LLC; Peter W. Peterson

[57] ABSTRACT

An apparatus for removing unwanted plants such as post harvested plants in a field, has a frame assembly, at least one depth wheel, at least one pair of counter-rotating cutter disc stacks supported by the frame assembly, the stacks being spaced from each other such that a plant passing between the pair of stacks is cut, each stack being formed from a plurality of axially spaced apart cutting discs.

19 Claims, 2 Drawing Sheets

PLANT CUTTING APPARATUS USING COUNTER-ROTATING CUTTER DISC STACKS

FIELD OF THE INVENTION

This invention relates to an apparatus and particularly relates to a plant shredding apparatus. The invention will be described with reference to the shredding of certain agricultural plants, such as cotton plants, but the invention need not be restricted to this embodiment and can extend to other plants such as sorghum, corn, sunflower and sugar cane.

BACKGROUND ART

In the cotton industry, the cotton crop is harvested by known harvesters which pick the cotton bolls from the bush. Left behind is a post-harvested cotton plant which needs to be removed. Other crops, for instance corn, also leave behind post harvested plants.

The post harvested cotton plants are not reused, and to date have been pulled up, raked into rows and burnt or flailed. However, burning is progressively being deterred, which makes it necessary to treat the cotton plants in other ways, for instance by putting mulch plants back into the soil for better conditioning of the soil.

One known apparatus is described in U.S. Pat. No. 4,350,207 which comprises feed rollers and a shredding unit. The rollers and shredding unit are positioned at a substantial distance away from the cotton plants. The cotton plants are ripped out of the ground by a puller tyre and are pulled up towards the rollers and shredder. The cotton plant is fed through a pair of opposed rollers to feed it into the shredder, and it is found that this arrangement is complicated, expensive, and often fails due to mud collecting on the rollers. The mud also creates increased wear and tear on the various components. The apparatus is also bulky and heavy and is generally unsuitable for use in soft and muddy conditions, as it causes soil compaction.

OBJECT OF THE INVENTION

The present invention is directed to an apparatus which can be used for cutting or shredding post-harvested plants, the apparatus being simpler in design, and less susceptible to the effects of mud and dirt.

It is an object of the invention to provide a plant shredding apparatus which may overcome the abovementioned disadvantages or provide the public with a useful or commercial choice.

SUMMARY OF THE INVENTION

In one form, the invention resides in a plant cutting apparatus, the apparatus comprising at least one pair of counter-rotating cutter disc stacks, the stacks being spaced from each other such that a plant passing between the pair of stacks is cut, each stack being formed from a plurality of axially spaced apart cutting discs.

This arrangement of providing pairs of counter-rotating disc stacks, allows the apparatus to be simple in design, robust, and less susceptible to breakdown with mud and dirt.

Suitably, the apparatus has a number of pairs of disc stacks, each pair of disc stacks able to shred a row of plants. The number of pairs of disc stacks may vary depending on how many rows of plants are to be cut at the same time, and will also depend on the size of the tractor or like vehicle, the softness of the soil, and the like.

A feed means may be provided to feed the plants towards and into the disc stacks. The feed means may also pull the plants out of the ground. The feed means can comprise a pair of opposed tyres.

If a number of pairs of disc stacks are provided, it is preferred that each disc stack has its own feed means.

Again, if a number of pairs of disc stacks are provided, these can be in linear alignment.

It is also envisaged that the apparatus can have more than two disc stacks, and it is possible for there to be three or more disc stacks forming a single unit which may be suitable for shredding some types of plants which are close together, particularly bushy, or otherwise less suitable for efficient shredding with only a pair of counter-rotating disc stacks.

The number of cutting discs in a disc stack can vary, and can depend on the height of the plant to be shredded. For cotton plants, a disc stack may comprise between two to eighty spaced apart cutting discs. Should the apparatus be required to shred only a portion of the cotton plant, such as the root zone only, the disc stack may comprise between two to ten cutting discs.

The cutting discs themselves may be of any suitable diameter which will depend on the type of plant to be cut or shredded. A typical disc may be between 10–100 centimeters in diameter, and appropriately thick. The disc may be formed from metal, such as mild steel, other grades of metal, or formed steels, which provide a reasonable balance between the cost of the disc and the wear and tear on the disc. The disc may have a sharpened cutting edge. It is preferred that each disc has a series of peripheral teeth. Alternatively, a scalloped peripheral edge comprising a number of scalloped portions may be provided.

Each disc stack in the pair of stacks may be positioned relative to each other such that the cutting blades overlap each other to provide a scissor effect which facilitates cutting or shredding of the plants. This arrangement can also function to clean the discs.

The discs in a particular stack are preferably axially aligned and spaced apart. The spacing between adjacent discs may vary which will vary the cut length of the plant. Typically, the discs are spaced apart by between 2–30 centimeters, although this can vary to suit the type of plant and the required coarseness of cutting.

The discs in a particular stack can be mounted to a central shaft. Preferably, the discs have a central opening which allows the discs to slide along the shaft. The shaft and openings are preferably profiled to prevent the discs from rotating relative to the shaft. Thus, the shaft can have a square, round with key or keyway, or other polygonal profile and the opening in the discs can be similarly profiled. The shaft can have a flattened side (for instance it can be semicircular in section) to prevent the discs from rotating relative to the shaft, while still allowing the discs to slide along the shaft. Alternatively, the discs are rigidly fixed to the shaft. Rotation of the shaft causes all the discs to rotate together. The shaft may be mounted for rotation and this can be achieved by using bearing blocks, or similar devices.

In order to reduce bending of each disc, the central shaft may be made relatively large in diameter. Alternatively, a normal diameter shaft may be used, and collars may be positioned between adjacent discs to reduce the flexibility of the discs. If desirable, the discs can be made sufficiently thick to prevent bending.

The collars can also function as spacers to space adjacent discs apart along the shaft. The collars can be separate items, or can form part of a disc.

A drive means may be provided to rotate the disc stacks. The drive means typically comprises a motor, such as a hydraulic motor. The motor may be positioned some distance away from the disc stack and suitable devices such as gears, gear boxes, drive shafts, pulleys, chains, sprockets and belts may be provided to rotate the disc stacks.

The drive means can comprise the power take off on the back of a tractor.

If the apparatus functions to pull a plant out of the ground prior to shredding it, the lower discs in a disc stack will shred the root portion of the plant, and the root portion will contain attached mud and dirt. Therefore, it is preferred that the lower discs in a disc stack include scrapers to provide a continued cleaning effect. The scrapers may comprise fingers extending between the discs to clean away any mud and debris.

The feed means may comprise opposed rubber tyres or feed chains. Alternatively, a pair spaced apart leading endless loop belts could be used. The belts can extend forwardly of a disc stack and counter-rotate. The feed means can pass along each side of a plant and the plant can be pulled out of the ground and fed towards the disc stacks by the feed means. The belts may extend around a forward pulley and a rear pulley. The rear pulley may be driven by the central shaft of a disc stack such that no separate drive means is required to power the feed means. Idler intermediate pulleys may be provided, if desired. Various other types of feed means may also be used including steel disc pullers.

BRIEF DESCRIPTION OF THE DRAWINGS

An embodiment of the invention will be described with reference to the following drawings in which.

DESCRIPTION OF THE PREFERRED EMBODIMENT

Figure 1:
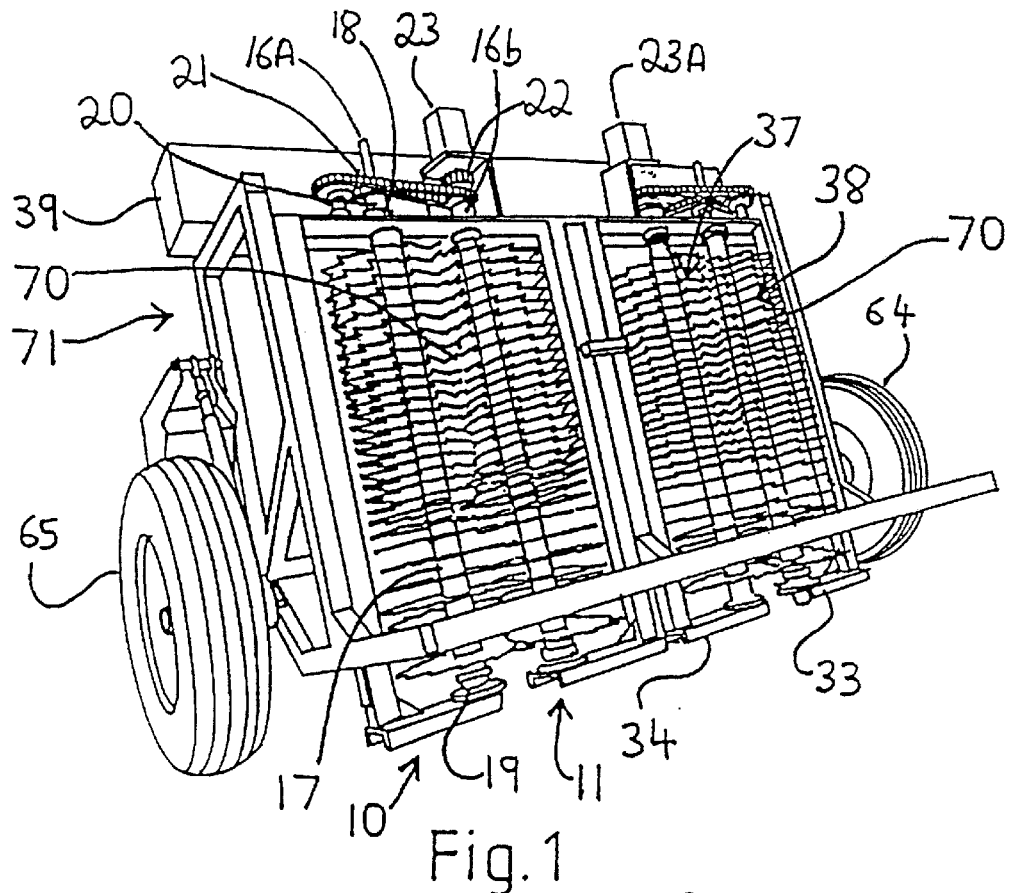
FIG. 1 is a rear view of an apparatus according to an embodiment of the invention and showing a pair of counter-rotating disc stacks.

Referring to the figures, and initially to FIG. 1 (which is the rear view of the apparatus), there is shown a pair of counter-rotating disc stacks 10, 11. Each disc stack is formed from a number of axially spaced apart cutting discs 12A–C, 13A–C. The stacks 10, 11 are spaced apart such that a plant (for instance a post-harvested cotton plant) can pass between disc stacks 10, 11 to be cut and shredded and flung to the rear of the apparatus.

Figure 3:
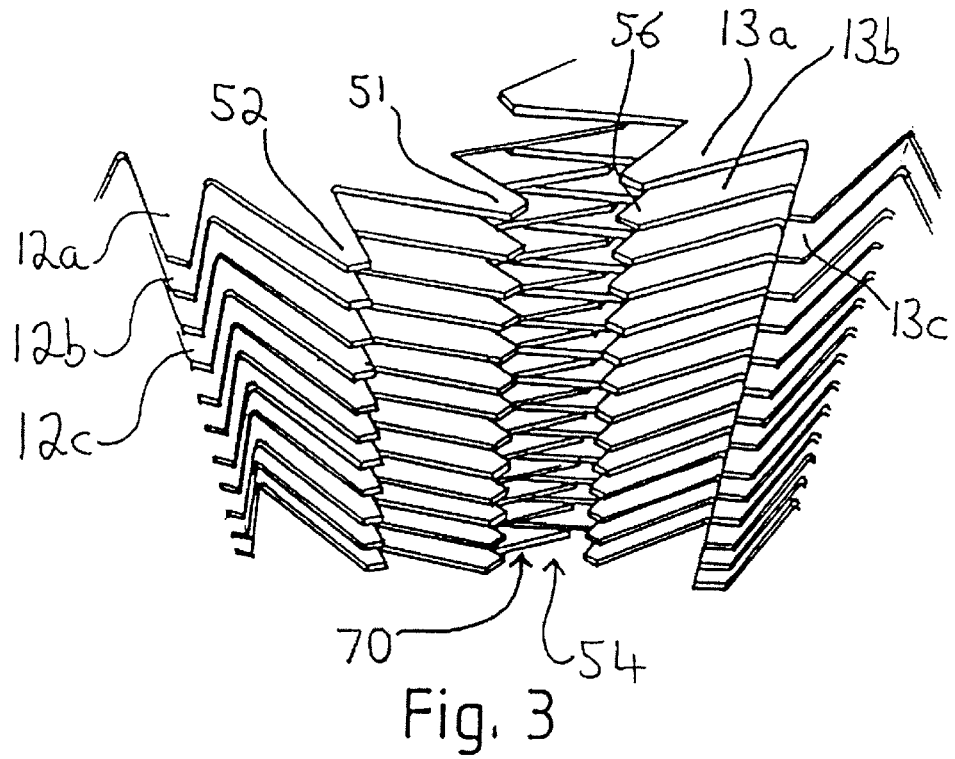
FIG. 3 is a close up view of a portion of the cutting discs in a disc stack.

Disc stacks 10, 11 are spaced apart in such a manner that individual cutting discs 12A–C on one of the stacks overlap cutting discs 13A–C on the other stack to provide a scissor-like action to effectively cut the plant as it passes between the pair of disc stacks (FIG. 3 illustrates the overlapping nature of the blades better). The overlapping movement also continuously cleans the blades. The disc stacks have a forward inlet area 70 into which plant material passes and a rear discharge area 71 through which the shredded plant material exits.

Between 2 and 80 cutting discs may be provided on each disc stack. FIG. 1 shows an apparatus where each disc stack has about 25–30 cutter discs, but it should be appreciated that this can vary depending on the type, size and height of plants to be shredded.

Each disc is formed from mild steel and has a diameter of between 10–φcm, preferably 10–50 cm and an appropriate thickness to stop the disc from bending too much. The discs have peripheral cutting teeth 51,52 etc (better illustrated in FIGS. 3 and 4) which improve the cutting and shredding ability.

Each disc stack has a central shaft 16A, 16B. The shaft has a square cross-section and each disc (see FIG. 4) has a square central opening 53 which allows the discs to be fitted onto the shaft to allow the discs to slide along the shaft but not rotate relative to the shaft. Of course, the discs could also be rigidly mounted to the shaft such as by welding. It is preferred however that the discs can slide along the shaft which makes replacement of discs easier.

As the discs can slide along the shaft, they are held apart by spacing collars 17 which are provided between adjacent discs. Collars 17 have a central opening such that they can be slid over shaft 16. To form a disc stack, it is necessary only to slide a disc, a spacing collar, a second disc, a second spacing collar and so on along the shaft. The thickness of the collars will determine the axial spacing between adjacent discs and, in FIG. 1, it can be seen that the lower discs are spaced further apart than the upper discs (the lower discs are spaced further apart as these are more easily fouled by dirt and mud during use). Collar 17 can also have a second benefit by allowing the discs to be formed from thinner (and therefore cheaper) material which would be susceptible to bending without the collar.

The shafts 16A, 16B are mounted for rotation at or adjacent their upper and lower ends by suitable bearing blocks 18, 19. A sprocket 20 is fixed to the top of shaft 16A about which a chain 21 can pass. The chain extends about an output sprocket 22 on a hydraulic drive motor 23.

Figure 2:
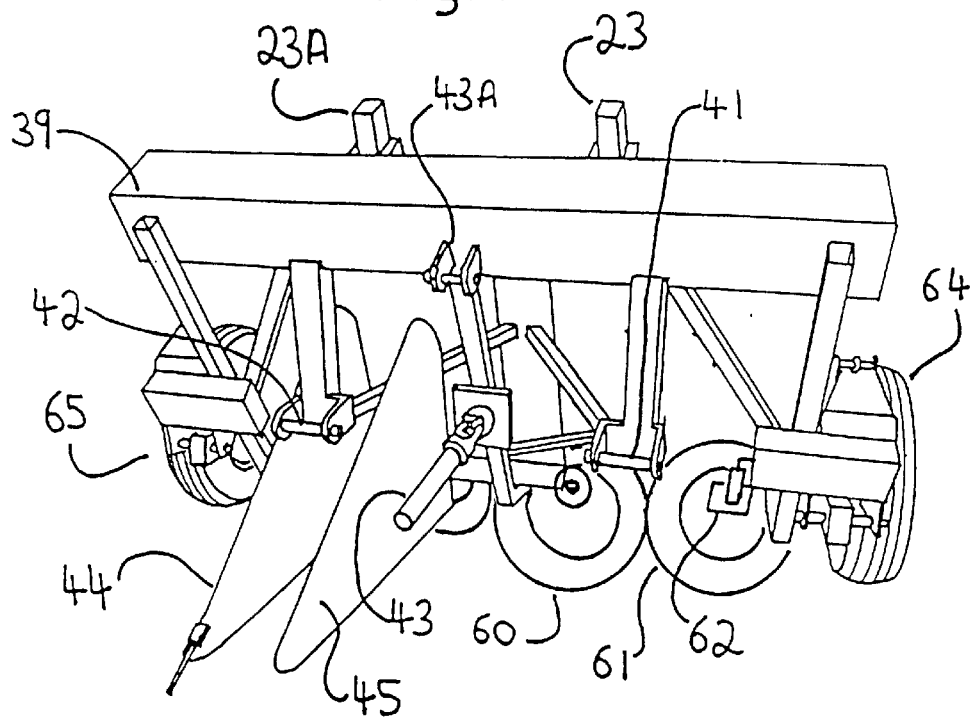
FIG. 2 is a front view of the apparatus of FIG. 1.

Referring to FIG. 2, there is shown the front of the apparatus. In the embodiment, the apparatus is attached to the rear of a tractor through linkages 41, 42, and 43A, and a power take-off shaft 43 is provided to power the apparatus.

The front of the apparatus has a pair of opposed guide chutes 44, 45 in front of each disc stack ( only one pair is illustrated) between which the plants can pass, the chutes assisting in straightening the plants before being fed into the disc stacks positioned immediately behind the chutes.

It is desirable to have a forward feed means to assist in feeding plant material between the opposed chutes and into the disc stacks. In the embodiment, the feed means comprises a pair of counter-rotating rubber tyres 60,61 positioned behind the guide chutes and closely spaced in front of the disc stacks. One of the tyres 61 is driven by a hydraulic motor 62, while the other tyre 60 freely rotates. The tyres function to grab a plant and pull/push it towards the cutting discs. The tyres are adjacent a lower portion of the stack such that the plants are gripped slightly above their root portion by the feed means, which is the thickest part of the plant. There is thus a reduced likelihood that the plant will simply break away from the root portion rather than be pulled up. In FIG. 2, the apparatus has two pairs of disc stacks, each having a pair of opposed tyres and a pair of guide chutes, but for the sake of simplicity, the guide chutes of one stack are omitted to show the opposed tyres 60,61.

As illustrated in FIG. 1, the lower cutting blades are spaced apart by a greater distance than the upper cutting blade, the reason being that the lower cutting blades are more susceptible to fouling by mud, and dirt. If desired, scraper fingers can be provided between adjacent lower cutting blades to keep the blades clean.

Figure 4:
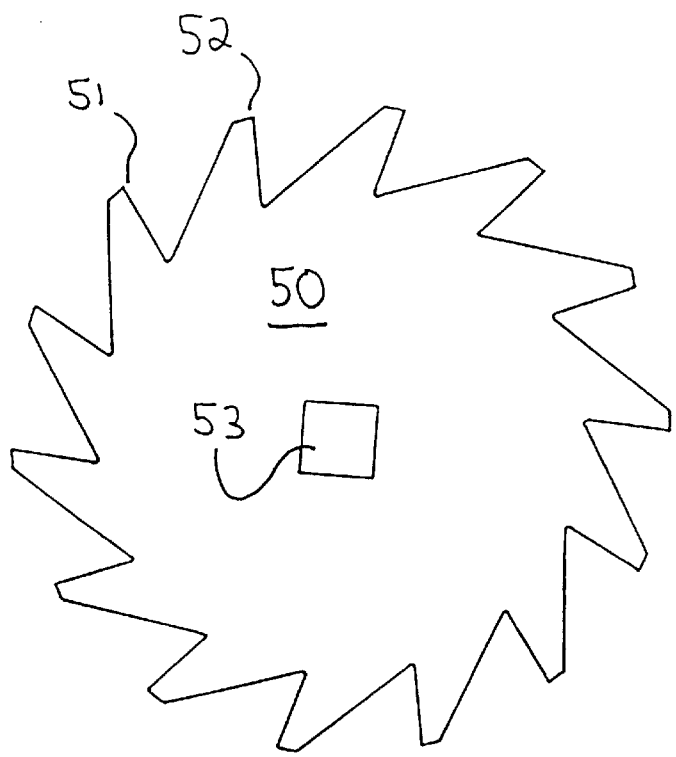
FIG. 4 is a plan view of a cutting disc.

Referring to FIGS. 3 and 4, the cutter blades are illustrated in more detail. Referring initially to FIG. 4, a cutter blade 50 includes a number of peripheral cutting teeth 51, 52 and a central square opening 53 which allows the blade 50 to slide along its shaft but not rotate relative to the shaft. A disc stack is formed from a number of identical cutter blades.

Referring to FIG. 3, there is shown a pair of disc stacks each consisting of a number of cutter blades. The cutter blades of one of the disc stacks rotate in an opposite direction to the cutter blades of the other of the disc stacks.

FIG. 3 illustrates that the particular design of the cutter blade and especially the cutter blade teeth increases the efficiency of the apparatus. By having all the cutter blades aligned on each shaft (by which is meant that the teeth overlap each other as illustrated in FIG. 3), the blade stacks can be "tuned" to facilitate the cutting action. FIG. 3 shows that by "tuning" the blades on one shaft relative to the blades on the adjacent shaft, a gap 54 is formed in which the plant stem can pass. As the blades counter-rotate, the edges of the blade teeth, for instance 51, 56 (and each blade below it) come together to grip the stem of the plant and force it between the disc stacks to be cut). Thus, the cutter discs themselves function to grip and push the plant between the disc stacks.

As also illustrated in FIG. 3, the cutter blades from one stack pass between and overlap the cutter blades from the other stack. The alignment is such that the cutter blades clean each other as they rotate. This cleaning or scraping action keeps the disc stacks clean and free from debris thereby improving the performance of the entire apparatus. The overlap spacing between the discs can be varied to provide a fine scissor like cutting action when the discs are closely overlapping, or a coarse shredding action when the discs are further spaced apart. This adjustment can be done by raising or lowering one of the shafts 16A, 16B relative to the other shaft, or by the correct choice of spacing collars.

The apparatus according to the embodiment has two pairs of disc stacks being a first pair of disc stacks 10, 11 which counter-rotate relative to each other, and a second pair of disc stacks 37, 38 which counter-rotate relative to each other. Although the figure illustrates only two pairs of disc stacks, it should be appreciated that any number of stacks can be provided. Each pair of disc stacks is supported by transverse members 33, 34 and a top beam 39. Each stack is powered by a single hydraulic motor 23, 23A. Each hydraulic motor directly rotates one of the shafts of a disc stack and through a sprocket and chain rotates the other shaft of the disc stack in the opposite direction.

The apparatus can be supported by depth wheels 64,65, although for smaller apparatus, the apparatus can be supported entirely by the tractor.

In a further variation, a smaller disc stack can be attached to a previously know shredding device, for instance the device illustrated in U.S. Pat. No. 4,350,207. This known shredding device has a feed means comprising a pair of opposed rubber tyres and a conveyor. The tyre pulls the cotton plant out of the ground with the root portion of the cotton plant extending below the feed conveyor. A disc stack according to the invention can be positioned relative to the conveyor to cut the root portions of the plants so that the remainder of the plant can be fed through the known device. By removing the root portion from the plant, most of the dirt and mud is removed which obviates one of the disadvantages with the known shredder being its inability to deal with mud and dirt.

It should be appreciated that various other changes and modifications can be made to the embodiment described without departing from the spirit and scope of the invention as claimed.

We claim:

1. A plant cutting apparatus which has at least one pair of counter-rotating cutter disc stacks which are generally upright and parallel relative to each other, the stacks being spaced from each other such that a plant passing through the pair of stacks is cut by each stack to make the same cut, each stack being formed from a plurality of axially spaced apart cutting discs wherein the cutting discs from one of the disc stacks overlap and are vertically spaced from the cutting discs of the other of the disc stacks, the vertical spacing between lower discs in each of the pair of disc stacks being spaced further apart than the vertical spacing between upper discs in each of the part of disc stacks, the disc stacks having a forward inlet area and a rear discharge area, the disc stacks of each pair rotating inwardly at the inlet area to pull the plant into the inlet area, through the pair of disc stacks to be cut by cooperative action between adjacent discs of each stack during the same cut, and out the rear discharge area.

2. The apparatus of claim 1, wherein at least some of the cutting discs have peripheral teeth.

3. The apparatus of claim 2, wherein the cutting discs from one of the disc stacks pass between the cutting discs from the other of the disc stacks.

4. The apparatus of claim 3, wherein the cutting discs from one of the disc stacks are closely spaced from the cutting discs of the other of the disc stacks to provide a scissor like cutting action and to clean the cutting discs.

5. The apparatus of claim 4, wherein a plurality of pairs of disc stacks are provided, each stack adapted to cut a row of plants.

6. The apparatus of claim 5, wherein between 2–80 cutting discs are provided on each disc stack.

7. The apparatus of claim 6, wherein the cutting discs have a diameter of between 10–100 cm.

8. The apparatus of claim 7, wherein the cutting discs are spaced apart between 2–30 cm.

9. The apparatus of claim 8, wherein the cutting discs are mounted to a central rotatable shaft.

10. The apparatus of claim 9, wherein the shaft is shaped, and the cutting discs have a central opening which is shaped to allow the discs to slide along the central shaft but not rotate relative to the central shaft.

11. The apparatus of claim 10, wherein the cutting discs are spaced apart along the shaft by spacing collars positioned between the cutting discs.

12. The apparatus of claim 2, wherein the cutting discs on each of the pair of disc stacks are aligned such that the peripheral teeth all overlap with each other when viewed in plan.

13. The apparatus of claim 12 wherein the peripheral teeth extend outwardly from the edge of the disc and are spaced apart from each other to define a gap between an adjacent pair of said teeth, the gap being large enough to accommodate the stem of the plant to be cut.

14. The apparatus of claim 13, wherein the peripheral teeth of the cutting discs grip the plant to feed it into the disc stack.

15. The apparatus of claim 14 including forward guide chutes to pass the plants towards the disc stacks.

16. A plant cutting apparatus which has at least one pair of counter-rotating cutter disc stacks which are generally upright and parallel relative to each other, the stacks being spaced from each other such that a plant passing through the pair of stacks is cut by each stack to make the same cut, each stack being formed from a plurality of axially spaced apart cutting discs wherein the cutting discs from one of the disc stacks overlap and are vertically spaced from the cutting discs of the other of the disc stacks, the vertical spacing between lower discs in each of the pair of disc stacks being spaced further apart than the vertical spacing between upper discs in each of the pair of disc stacks, the disc stacks having a forward inlet area and a rear discharge area, the disc stacks of each pair rotating inwardly at the inlet area to pull the plant into the inlet area, through the pair of disc stacks to be cut by cooperative action between adjacent discs of each stack, during the same cut, such that the plant is shredded and flung out the rear discharge area.

17. The apparatus of claim 16 wherein the cutting discs from one of the disc stacks are closely vertically spaced from the cutting discs of the other of the disc stacks to provide a scissor like cutting action and to clean the cutting discs.

18. The apparatus of claim 16 wherein the cutting discs from one of the disc stacks overlap and are vertically spaced from the cutting discs of the other of the disc stacks, the vertical spacing between the discs being adjustable to provide a scissor like cutting action when the cutting discs are closely vertically spaced or a coarse shredding action when the cutting discs are further vertically spaced apart.

19. The apparatus of claim 16 including a frame assembly from which the counter-rotating cutter disc stacks are supported and a depth wheel on said frame assembly, said apparatus being adapted to be towed behind a vehicle.

* * * * *